United States Patent
Olesen et al.

(10) Patent No.: US 7,318,335 B2
(45) Date of Patent: Jan. 15, 2008

(54) ULTRASONIC GAS LEAK DETECTOR INCLUDING A DETECTOR TESTING DEVICE

(75) Inventors: Martin Tranderup Olesen, Hellerup (DK); Kjeld Henning Petersen, Skodsborg (DK)

(73) Assignee: Gassonics A/S (DK)

( * ) Notice: Subject to any disclaimer, the term of this patent is extended or adjusted under 35 U.S.C. 154(b) by 177 days.

(21) Appl. No.: 10/545,001

(22) PCT Filed: Jul. 2, 2004

(86) PCT No.: PCT/IB2004/051106

§ 371 (c)(1),
(2), (4) Date: Aug. 10, 2005

(87) PCT Pub. No.: WO2005/036120

PCT Pub. Date: Apr. 21, 2005

(65) Prior Publication Data

US 2006/0191341 A1    Aug. 31, 2006

(30) Foreign Application Priority Data

Oct. 8, 2003   (EP) .................................. 03022488

(51) Int. Cl.
*G01N 29/30* (2006.01)

(52) U.S. Cl. ...................... 73/1.02; 73/1.82; 73/40.5 A; 73/592

(58) Field of Classification Search ............. 73/40.5 A, 73/1.01, 1.02, 1.82, 592
See application file for complete search history.

(56) References Cited

U.S. PATENT DOCUMENTS

| 4,043,180 | A |   | 8/1977 | Morris et al. |
| 4,609,994 | A | * | 9/1986 | Bassim et al. ................. 702/39 |
| 4,640,121 | A |   | 2/1987 | Leuker et al. |
| 4,823,600 | A |   | 4/1989 | Biegel et al. |
| 6,698,269 | B2 | * | 3/2004 | Baber et al. .................. 73/1.08 |

FOREIGN PATENT DOCUMENTS

| GB | 2 176 604 | 12/1986 |
| JP | 58-100729 | 6/1983 |
| JP | 63-070139 | 3/1988 |
| NO |   169678  | 4/1991 |

* cited by examiner

*Primary Examiner*—Daniel S. Larkin
(74) *Attorney, Agent, or Firm*—Stites & Harbison PLLC; Marvin Petry

(57) ABSTRACT

An ultrasonic gas leak detector of the kind where a detector transducer senses airborne acoustic ultrasonic sound waves emitted from a leakage in a gas installation is provided. The detector is provided with self-test means according to which an ultrasonic signal is emitted by a test transducer provided as an integral part of the detector, this signal being received by the detector transducer. By these means an ongoing self-test of the performance of the essential components of the detector, e.g. the detector transducer itself, the various electronic circuits of the detector, etc., can be carried out and an alert signal can for instance be transmitted to a central alarm system if inappropriate performance of the detector is discovered. The present detector can be specially designed for fixed installation in an explosion-endangered environment.

14 Claims, 3 Drawing Sheets

ULTRASONIC GAS LEAK DETECTOR INCLUDING A DETECTOR TESTING DEVICE

TECHNICAL FIELD

The present invention relates to fixed ultrasonic gas leak detection devices and systems used for instance for monitoring outdoor gas installations and more particularly to a self-test method and corresponding means for such devices and systems.

BACKGROUND ART

Various methods and corresponding devices are used for the detection of gas for instance leaking from high-pressure gas installation pipelines in industrial plants or offshore installations. Thus, it is known to use catalytic point sensors or infrared point sensors where the sensor generates a signal after the sensor having been exposed to a certain minimum concentration of a gaseous agent for a given minimum of time. The concentration can be measured in LEL (Lower Explosive Level), which indicates when an explosive mixture is reached between the gas and the oxygen in normal air. Such sensors need thus to be in actual physical contact with the gaseous agent in order to generate a signal, which can for instance be used for triggering an alarm. According to a different method, so-called open path sensors are used, comprising an infrared (IR) transmitter and a corresponding receiver for receiving the IR signal transmitted by the transmitter and positioned at a certain distance from each other, i.e. with a certain signal propagation path there between. When a given concentration (LEL level) of a gaseous agent enters the propagation path between the transmitter and receiver, at least a portion of the IR signal is being absorbed by the gas and hence the portion actually received at the receiver decreases. Thus, the presence of a gaseous agent in the propagation path is detected by the receiver, which can for instance elicit an alarm signal.

By either of the above methods, it is possible not only to detect the presence of gas, but also to determine its concentration. It may, however, be desirable, either in combination with the above detection means or in itself, to provide a gas leak detector, which does not require the building-up of a given minimum concentration of gas before eliciting a detection signal, but which is capable of generating an instant alarm signal, for instance at the escape of gas through a leakage in a pipeline, etc.

A method and corresponding detector device can be based on the fact that the escape of gas at sufficiently high pressure through a leakage, for instance, in a pipeline, generates airborne acoustic sound waves of a very large bandwidth. The amplitude of the sound signal is partly related to the mass flow rate (leak rate) from the leakage. The leak rate of the gas from the leakage is measured in the unity Kg/Sec. The leak rate is mainly determined by the gas pressure immediately before (upstream of) the leakage and the size of the leak. Other factors, for instance the molecular weight of the gas and the gas temperature, have been found to have less influence on the sound signal generated by the leakage. Thus, the frequency spectrum of sound waves generated by this mechanism extends far into the ultrasonic region. The ultrasound portion of the signal generated by the leakage can thus be picked up by an ultrasound-receiving transducer, the positioning of which relative to the leakage will not be critical, which is of course important in installations comprising spatially widely distributed components that could potentially contain leakages. A very important advantage of this type of detector is that it does not require being in physical contact with the gas or that the gas be present in a predetermined propagation path. The correct functioning of a detector based on this principle is therefore less affected by wind carrying the gas away from the detector or by the gradual dilution of the gas as the gas spreads over a larger area.

Gas leak detectors of the above kind are known within the art and are known to function satisfactorily at distances between a leakage and a detector of up to approximately 15 meters.

A system for detection of, for instance, leakages in pipelines, etc. of the above kind is disclosed in EP 0 315 199 where the system comprises detector devices provided with directional transducers for detecting ultrasonic vibrations generated by a leakage in the vicinity of the transducer. According to this document, detector devices are provided throughout the installation at critical locations points, valves etc.) where leakages could be expected to occur. Thus, this system is specifically designed for use in installations where a certain a priori knowledge of the location of possible leakages is present and where consequently detector transducers with a narrow directional characteristic pointing directly towards the critical location can advantageously be used.

When such gas leak detectors are installed at a site, such as an off-shore installation remote from a central alarm system, it is important continuously to ascertain that the detector is functioning reliably, i.e. that the absence of a signal from the detector indicating the presence of a gas leak is actually due to the fact that no such leak is present in the installation and is not caused by malfunctioning of the detector device itself. It is thus important that a detector of this type be provided with means for performing a self-test procedure, the self-test comprising all components of the detector, i.e. not merely the electronic circuits of the detector, but also the detector transducer and optional wind screens or other protective devices encapsulating the transducer. Advantageously, the test system and procedure should provide for a simple implementation hereof.

SUMMARY OF THE INVENTION

In view of the above background, it is an object of the present invention to provide an ultrasonic gas leak detector device comprising self-test means for monitoring the correct functioning of the complete detector including detector transducer(s) and optional protective devices, such as wind screens, surrounding said transducer(s).

It is a further object of the present invention to provide a detector device of the above kind, which can be mounted as a fixed installation in an explosion-hazardous environment.

It is a further object of the present invention to provide a complete detector system comprising a detector device of the above kind in communication with a central alarm system, which can be located remotely relative to the detector device, the detector device being for instance mounted in an off-shore natural gas installation and the alarm system being mounted in non-explosion endangered environment where it can raise an alarm.

These and other objects are attained with an ultrasonic gas leak detector device comprising a housing provided with a detector transducer for receiving acoustic broadband noise (S1) generated by a gas leak and propagating through air, where the housing being designed for use in explosion endangered environments, and where the housing on an external surface hereof being provided with at least one test transducer for emitting an acoustic signal (S2), which can be received by the detector transducer, the device further comprising self-test means by means of which the device is tested ongoing by the acoustic signal (S2) emitted from the at least one test transducer, whereby the correct functioning of the detector device can be monitored.

The present invention also relates to a system which includes the aforementioned ultrasonic gas leak detecting device connected to an external system.

The present invention also relates to a method for self-testing an ultrasonic gas leak detector. The method includes repetitively emitting a test signal (S2) from the test transducer; receiving the test signal (S2) at the detector transducer; determining whether the sound pressure level of the test signal (S2) at the detector transducer falls within a given tolerance range; wherein, if the sound pressure level of the test signal (S2) at the detector transducer does not fall within the tolerance range (ΔL), generating an alert signal or analogue and/or digital interface signal indicating a possible malfunctioning of the detector.

According to the present invention, there is, thus, provided an ultrasonic gas leak detector device comprising a housing provided with a detector transducer for receiving acoustic broadband noise (S1) generated by a gas leakage and propagating through air, where the housing is designed for use in explosion—endangered environments. The housing is on an external surface of the device and is provided with at least one test transducer for emitting an acoustic signal (S2), which can be received by the detector transducer. The device further comprises a self-test means by means of which the device is tested ongoing by the acoustic signal (S2) emitted from the at least one test transducer, whereby the correct functioning of the complete detector device can be monitored.

Specifically the test signal (S2) emitted by the test transducer(s) could be an ultrasonic signal.

According to a specific embodiment of the device according to the invention, the detector device further comprises means for isolating the ultrasonic part of the acoustic broadband noise (S1) for further processing in the device. Such means could for instance be an analogue high-pass filter or an equivalent digital filter with a suitable lower cut-off frequency. In order to limit the signal to be processed in the detector to the ultrasonic region, the cut-off frequency could be chosen to approximately 20 kHz.

The detector transducer in the device according to the invention has a directional characteristic suitable for picking up sounds generated by leakages in any pertinent direction relative to the detector device, i.e. throughout the installation in question. Examples of such directional characteristics would be an omnidirectional characteristic or a widespread, cone-shaped characteristic below the detector device, but other characteristics could also be envisaged.

By basing the self-test function on the emission of an acoustic signal in the ultrasonic frequency range used for the detection of a gas leak in an installation, the correct functioning of the complete device, inclusive of leak detector transducer, electronics and a possible windscreen or other protective device surrounding this transducer, can be ascertained in a simple and reliable fashion.

The detector according to the invention outputs at least three signals: (1) one signal indicating a gas leakage for eliciting a corresponding alarm, (2) a real time DC signal that relates to the ultrasonic sound level measured by the microphone, also called: "the 4-20 mA" interface, (3) one signal indicating that the detector does not function properly, (4) digital communication interface, and (5) AC analogue microphone signal output.

According to a presently preferred embodiment of the invention, there is, thus, provided a detector for detection of gas leakages by means of the ultrasonic signal generated by a gas leakage, where the detector is able to sense an acoustic signal in the frequency region above approximately 20 kHz. The detector is provided with self-test means where the appropriate function of an acoustic receiver (detector transducer) is subjected to an ongoing test procedure by means of an integrated, external noise source (a so-called "fail safe" procedure). The detector according to this presently preferred embodiment of the invention is furthermore designed for installation in explosion-endangered environments (EX approved), and furthermore designed for fixed installation. Furthermore, the detector according to this presently preferred embodiment of the invention is provided with communication means for communication with a central alarm system, implemented as a so-called 4-20 mA Interface, relay output for both alarm trigger level setting and error alarm for indication of internal instrument failure. Furthermore, there is provided a digital communications interface for digital communication.

The positioning of the test transducer(s) on the same housing as the detector transducer and in the vicinity hereof is advantageous both in order to minimise the necessary acoustic power emitted by the test transducer and in order to facilitate the design of the detector device as a unit which can be approved for use in explosion—endangered environments. Furthermore, the design of the detector device as an integrated unit reduces the costs of installation, as for instance cables for signal communication and power supply between one or more separate test transducer(s) and the detector device can thereby be avoided.

Although the self-test procedure utilising a test signal generated by a test transducer and picked up by the detector transducer is advantageous from the point of view of ascertaining the correct performance of the complete detector device, including detector microphone, protective means, such as a wind screen provided around the detector transducer and the various electronic circuits and connections of the detector, other self-test procedures can also be incorporated in such devices, either as an alternative to the above procedure or in combination herewith as an option. Thus, it is possible to provide the detector with self-test means for performing an electronic test of the detector transducer (for instance a so-called charge injection calibration of the transducer) and/or the electronic circuits in the detector device.

BRIEF DESCRIPTION OF THE DRAWINGS

The invention will now be described in more detail with reference to the accompanying drawings, in which.

DETAILED DESCRIPTION OF THE INVENTION

In the following, a detailed description of an embodiment of the ultrasonic gas leak detector according to the invention is given.

Figure 1:
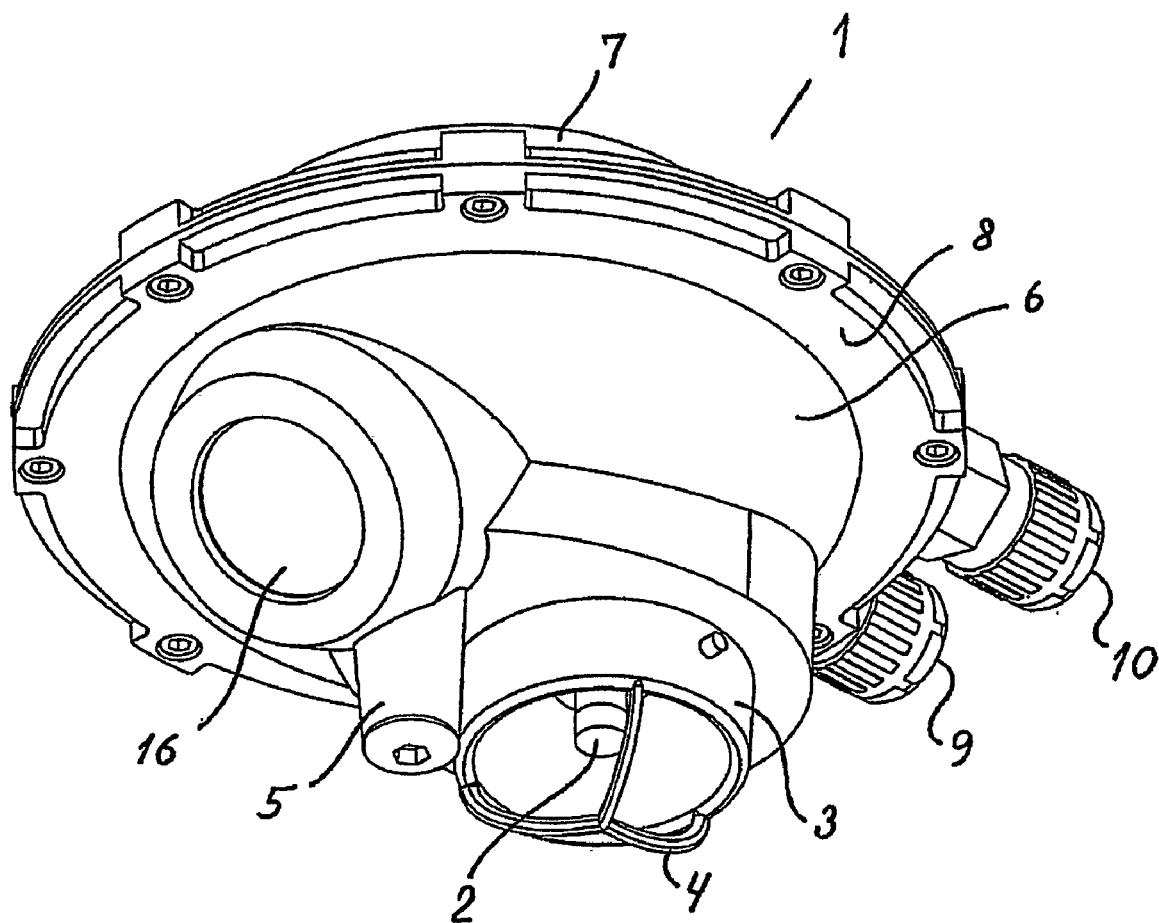
FIG. 1 is a perspective view of an embodiment of a device according to the present invention.
Figure 2:
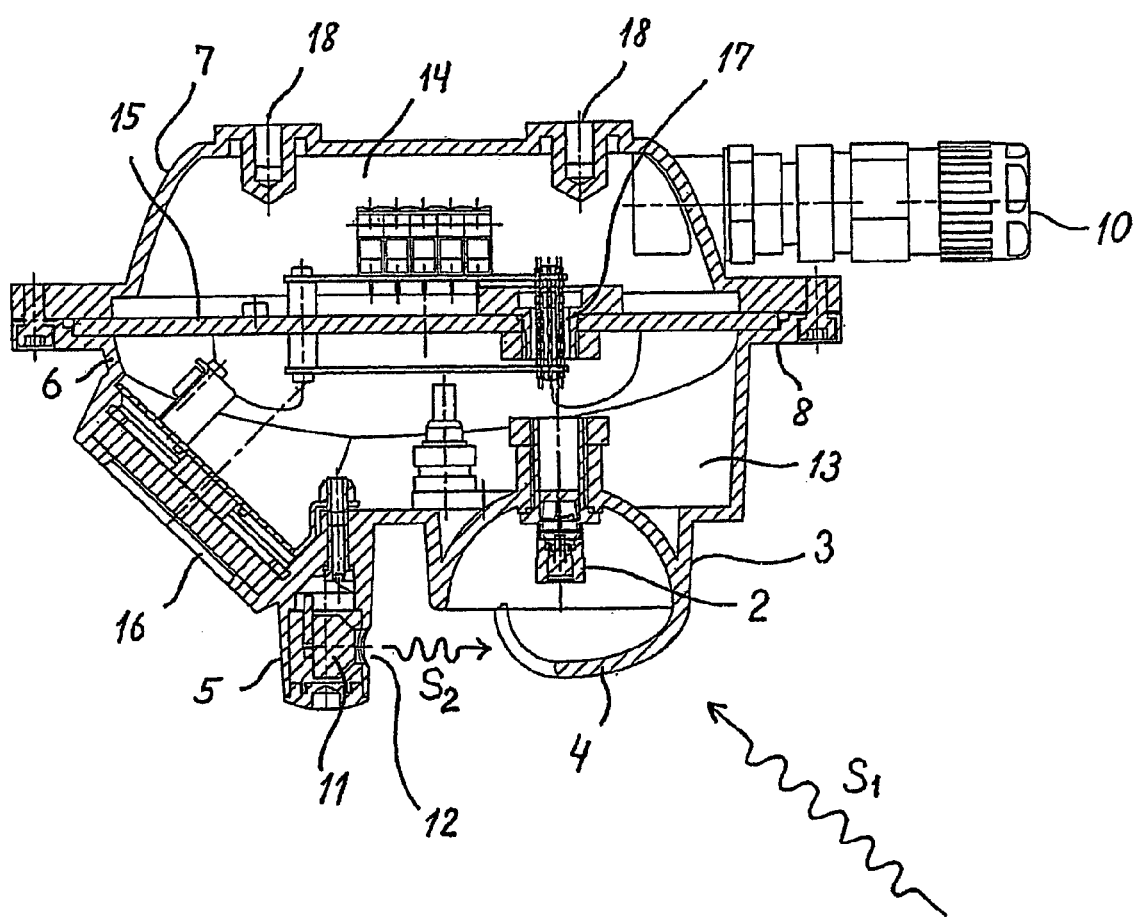
FIG. 2 is a cross-sectional side elevational view of the embodiment shown in FIG. 1.

With reference to FIGS. 1 and 2 there is shown an embodiment of the detector device according to the invention generally referred to by reference numeral 1. The detector comprises a housing consisting of an upper section 7 and a lower section 6 with internal cavities 13 and 14, respectively. Between these cavities extends a partitioning wall 15 provided with a communicating passage 17 providing access for electrical connectors from between said two cavities. The lower section 6 is provided with outlets 9 and 10 for communication between the detector and external equipment, such as a central alarm system. The lower section 6 is furthermore provided with display means 16.

In the lower section of the detector device, there is located the detector transducer 2, which is able to detect an ultrasonic sound signal emitted by a gas leakage. The detector transducer can in principle consist of any transducer capable of generating an electrical output signal in response to an ultrasonic signal, although the transducer in practice must meet certain requirements relating to high-frequency sensitivity, stability, robustness and the choice of material, etc., to make it compatible with the environmental conditions in which it is to operate. The detector transducer 2 is situated within a suitable housing 3 that also provides the detector with certain acoustic characteristics and can optionally be provided with protective means 4, for instance a windscreen to avoid noise from wind at high air speeds. In case of a gas leakage, the detector transducer 2 receives an ultrasonic signal S1 emitted from the leakage.

On the lower section 6 there is furthermore provided a test transducer 11 accommodated within a suitable housing 5 and communicating with the surroundings through an opening 12 in said housing 5. The opening 12 preferably faces the detector transducer 2 although other configurations could also be used. During operation, the test transducer 11 emits an ultrasonic test signal S2, which is picked up by the detector transducer 2. An example of a test procedure will be described below.

The housing of the detector device is provided with holes 18 with thread by means of which it can be fixedly attached at a proper location in the installation to be monitored.

The housing of the detector is divided into two "chambers" where the lower chamber 6 contains all electronics. The upper chamber 7 contains connection terminals for detector communication and power supply as well as gland access holes for external cable entrance.

The detector shall be available for both the European market and the North American market, where the requirements to the design rules for designing instrumentation in explosive areas are different.

The detector has been designed so that the same mechanical/electrical design will be valid in both Europe and North America, but the marking on the detector will be different for the two markets.

In the European market, the lower chamber will be classified as a solaced Ex d chamber that can withstand an internal explosion, whereas the upper chamber 7 will be classified as an Ex e chamber also called "increased safety area".

In North America, both the lower 6 and the upper 7 chamber will be classified as Ex d chambers.

The microphone 2 and the piezo-electric transducer 11 will be classified as intrinsically safe devices outside the lower 6 Ex d chamber.

The complete detector housing is made of stainless steel 316 according to proper design requirements for both European ATEX requirements and North American design regulations for instrumentation to be installed in explosive atmospheres.

Figure 3:
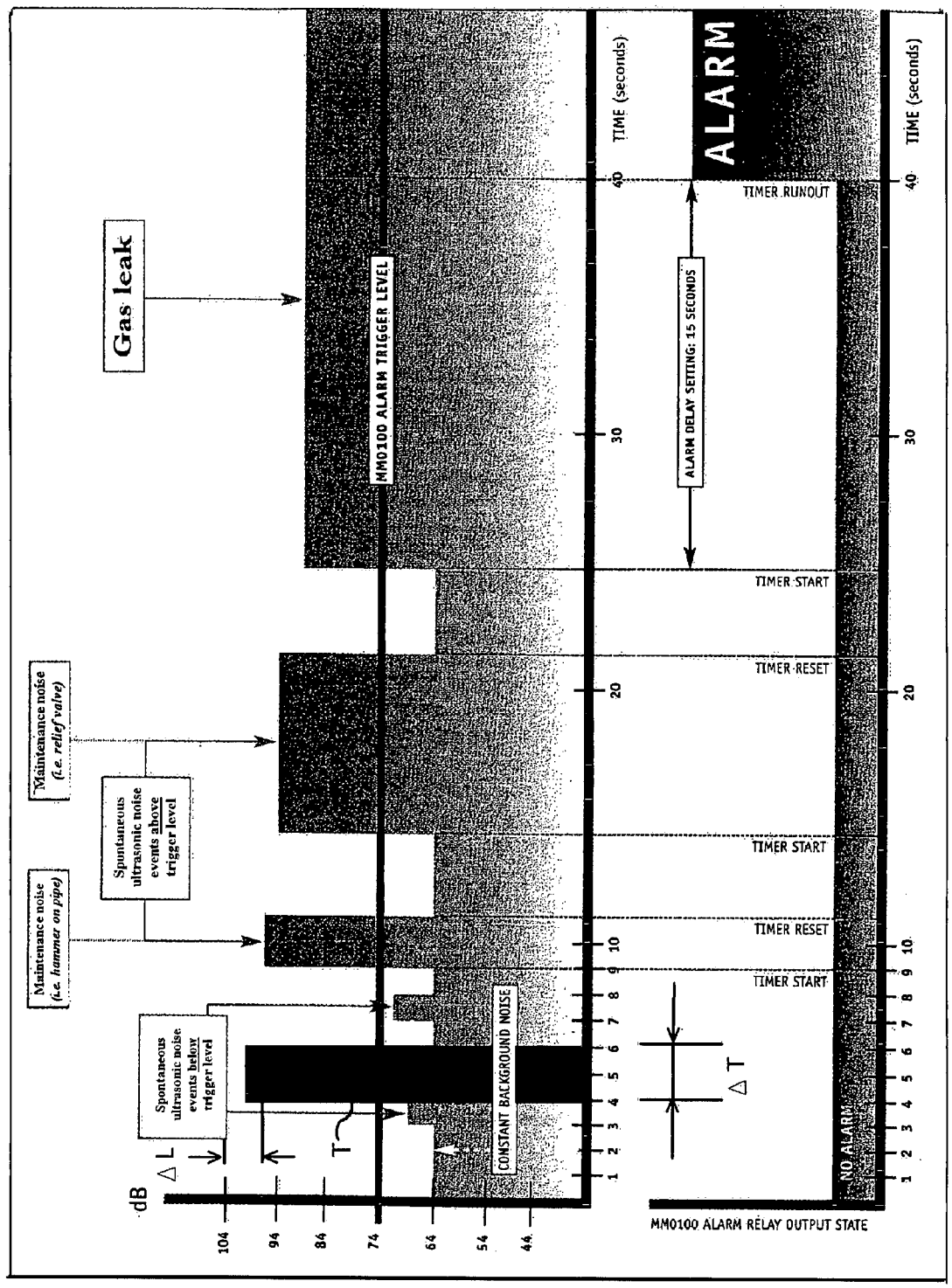
FIG. 3 is a graph illustrating the functioning of the self-test method according to the invention.

Referring now to FIG. 3 there is shown a graph illustrating an example of the operation of a detector device according to the present invention. The upper portion of the graph illustrates the ultrasonic sound pressure level (SPL) at the detector microphone as a function of time. A certain level of background noise will be present in any installation as indicated on the figure. At a predetermined and adjustable level above this background level, an alarm trigger level is located, this level being as an example set to 74 dB SPL in the example shown in FIG. 3. During normal operation, the installation occasionally emits ultrasonic signals indicated as spontaneous ultrasonic noise events and maintenance noise in FIG. 3. The emissions are thus not caused by a leakage in the installation and should hence not lead to an alarm being elicited. In order to prevent such false alarms from occurring, the detector device is provided with an adjustable timer function by means of which a delay for triggering the alarm can be set. Thus, ultrasonic noise events in the installation with a time duration shorter than the set delay do not give rise to an alarm. Only if the ultrasonic sound pressure level exceeds the alarm trigger level and the duration of this ultrasonic sound pressure level exceeds the specifically chosen delay, an alarm signal will be generated by the detector device for eliciting an alarm, for instance in a central alarm system at a remote site.

As furthermore indicated in FIG. 3, a test signal T emitted by the test transducer 11 is also received at the microphone 2. This test signal T is repeated at a certain predetermined interval and the test signal has a given duration □T. According to the embodiment of the self-test method shown in FIG. 3, the level of the test signal is above the alarm trigger level and also above the (highest expected) level of ultrasonic maintenance noise. Specifically the duration of the self-test signal is set to two (2) seconds in the present example and the signal could be repeated every five (5) minutes, but these specific values are of course only examples of values, which could be chosen in an actual set-up.

Every time the microphone registers the reception of the test signal, the sound pressure level of the received test signal must fall within a given predetermined tolerance range, and if the level of the test signal falls outside this range, an alert signal indicating an operational error of the detector is generated and communicated for instance to said central alarm system.

Specifically, the test signal could consist of a sinusoidal signal of a frequency of for instance 40 kHz, but many other choices of test signal would of course also be possible—and might even prove advantageous in relation to the overall nature (for instance spectral content) of the particular installation. Thus, for instance, single frequency sinusoidal signals at other frequencies within the ultrasonic region could be used as well as narrow band ultrasonic noise signals.

Although a specific embodiment of the present invention has been shown and described in the preceding parts of the detailed description, it is understood that a person skilled in the art may conceive other embodiments of the invention without departing from the scope of the invention as defined by the following claims.

LIST OF REFERENCE NUMERALS

Ultrasonic gas leak detector
Detector transducer
Housing of detector transducer

Protector of detector transducer
Housing of test transducer
Upper section of device
Lower section of device
Connecting flange
Output/input
Output/input
Test transducer
Emission opening
Cavity of upper section
Cavity of lower section
Partitioning wall
Display
Communication passage
Threaded holes

The invention claimed is:

1. An ultrasonic gas leak detector device comprising a housing provided with a detector transducer for receiving acoustic broadband noise (S1) generated by a gas leak and propagating through air, where said housing being designed for use in explosion endangered environments, and where said housing on an external surface hereof being provided with at least one test transducer for emitting an acoustic signal (S2), which can be received by said detector transducer, said device further comprising self-test means by means of which said device is tested ongoing by said acoustic signal (S2) emitted from said at least one test transducer, whereby the correct functioning of the detector device can be monitored.

2. The device according to claim 1, further comprises means for isolating an ultrasonic part of said acoustic broadband noise (S1) for further processing in the device.

3. The device according to claim 1 wherein said acoustic signal (S2) emitted from the at least one test transducer is an ultrasonic signal.

4. The device according to claim 1, wherein said at least one test transducer emits an acoustic signal (S2) which at said detector transducer gives rise to a sound pressure level, which is not interfering with an ultrasonic background level normally present at the detector transducer.

5. The device according to claim 1, further comprises being accommodated in a housing designed for fixed installation.

6. The device according to claim 1, wherein the detector is provided with means for analogue and/or digital communication with an external system.

7. The device according to claim 6, wherein said external system is a central alarm system.

8. The device according to claim 6, wherein said communication means comprise a 4-20 mA interface, relay output for alarm trigger level setting and error alarm for indication of internal instrument failure.

9. The device according to claim 1, wherein it further comprises a digital communications interface.

10. The device according to claim 1, wherein said detector device is provided with self-test means for performing an electronic test of said detector transducers and/or electronic circuits in the detector device.

11. An ultrasonic gas leak detection system comprising a detector device according to claim 1 and connected to an external system.

12. The system according to claim 11, wherein said external system is an alarm system provided with means for eliciting an alarm signal if it is determined that a signal received by the detector transducer is caused by a gas leak, and means for providing an alert signal if it is determined that a signal emitted by the test transducer does not give rise to a corresponding expected signal from the detector.

13. An ultrasonic gas leak detector device comprising a detector transducer for receiving an ultrasonic signal (S1) generated by a gas leak, wherein said device is provided with self-test means for performing an electronic test of said detector transducer and/or electronic circuits in the detector device, whereby the correct functioning of main parts of the detector device can be monitored.

14. An ultrasonic gas leak detector self-test method for a detector provided with a detector transducer for receiving an acoustic signal (S1) generated by a gas leakage and a test transducer for emitting an acoustic test signal (S2), said method comprising the following steps:
 (a) repetitively emitting a test signal (S2) from said test transducer;
 (b) receiving said test signal (S2) at said detector transducer;
 (c) determining whether the sound pressure level of said test signal (S2) at the detector transducer falls within a given tolerance range;
 wherein,
 (d) if said sound pressure level of the test signal (S2) at the detector transducer does not fall within said tolerance range ($\Delta L$), generating an alert signal or analogue and/or digital interface signal indicating a possible malfunctioning of the detector.

* * * * *

UNITED STATES PATENT AND TRADEMARK OFFICE
CERTIFICATE OF CORRECTION

| | |
|---|---|
| PATENT NO. | : 7,318,335 B2 |
| APPLICATION NO. | : 10/545001 |
| DATED | : January 15, 2008 |
| INVENTOR(S) | : Olesen et al. |

It is certified that error appears in the above-identified patent and that said Letters Patent is hereby corrected as shown below:

On the Title page under data item (73) Assignee:
change "Gassonics A/S (DK)" to -- GASSONIC A/S --.

Signed and Sealed this

Third Day of June, 2008

JON W. DUDAS
*Director of the United States Patent and Trademark Office*